INVENTOR.
JULIUS BLOCH
BY George B White
HIS ATTORNEY

May 22, 1951 — J. BLOCH — 2,553,890
COLLAPSIBLE TRIPOD BASE
Filed May 31, 1946 — 3 Sheets-Sheet 2

INVENTOR.
JULIUS BLOCH
BY George B. White
HIS ATTORNEY

May 22, 1951 J. BLOCH 2,553,890
COLLAPSIBLE TRIPOD BASE
Filed May 31, 1946 3 Sheets-Sheet 3

INVENTOR.
JULIUS BLOCH
BY George B. White
HIS ATTORNEY

Patented May 22, 1951

2,553,890

UNITED STATES PATENT OFFICE 2,553,890

COLLAPSIBLE TRIPOD BASE

Julius Bloch, San Francisco, Calif.

Application May 31, 1946, Serial No. 673,227

6 Claims. (Cl. 248—194)

This invention relates to a collapsible tripod base or leg base for facilitating the moving around of a tripod, and particularly of the type of tripod used for photographic equipment and photographic cameras.

An object of the invention is to provide a support or base which is adapted to receive the legs of an object therein in extended position whereby the object can be easily pushed around in position at various locations and various angles as desired.

Another object of the invention is to provide a support which is adapted to receive the legs of tripods of various types and to support the same in such a manner that by exerting a pushing force on the tripod around the legs the entire unit is easily rolled on the ground to the desired position.

A further object of the invention is to provide a base or support for tripods or the like which is also adapted to carry with it certain accessories necessary in connection with the operation of the object carried on the tripod, for instance, in case of photographic equipment, the base is adapted to carry in proper position the flood lights or the like and to point the said flood lights simultaneously with the moving of the photographic equipment in a predetermined relation or the like.

Another object of the invention is to provide a base for tripods of the character described which can be readily collapsed and transported in collapsed position, and which is securely held in the extended position and easily rolled with the weight thereon.

Another object of the invention is to provide a collapsible tripod base which is highly useful and simple in construction. Convenience of arrangement, lightness and comparative inexpense of manufacture are further objects which have been borne in mind in the production and development of the invention.

The essential features of the invention involved in the carrying out of the objects indicated are susceptible to modification, but a preferred embodiment of the invention is shown in the accompanying drawings, in which.

Figure 3:
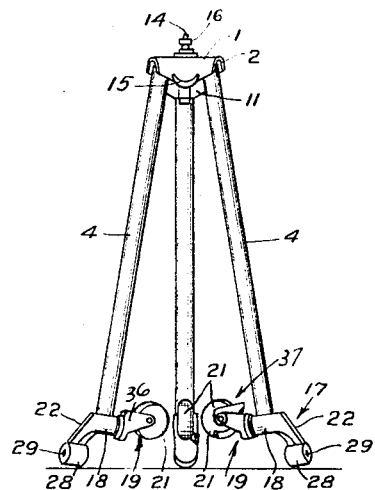
Fig. 3 is a side view of the base in collapsed position.
Figure 4:
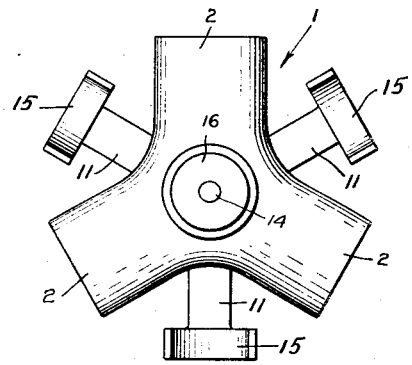
Fig. 4 is a detail plan view of the hub brackets supporting the legs of the base.
Figure 5:
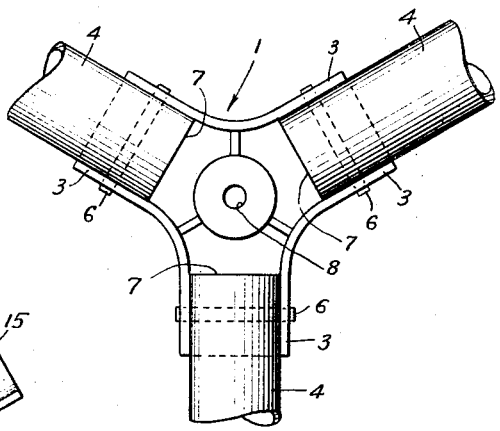
Fig. 5 is a fragmental plan view of the hub portion of the base showing the pivotal support of the spokes or arms of the base.
Figure 6:
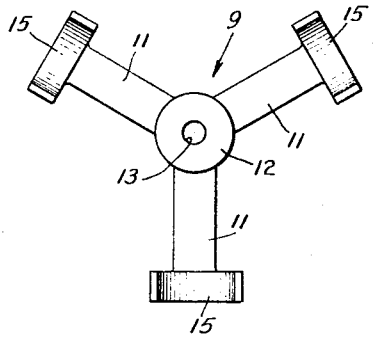
Fig. 6 is a plan view of the clamping element on said hub.
Figure 7:
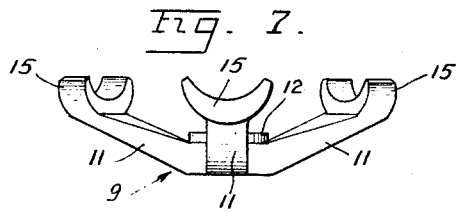
Fig. 7 is a side view of said clamping element.
Figure 8:
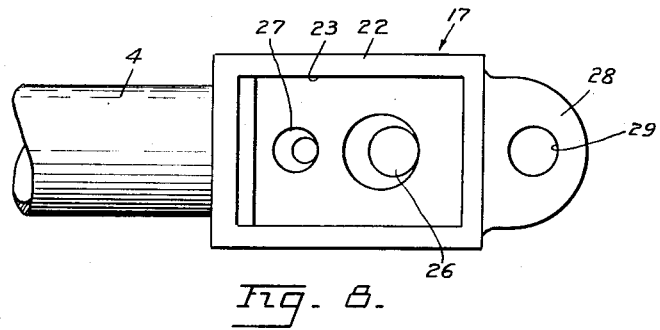
Fig. 8 is an enlarged detail plan view of the engagement socket in the ends of the arms of said base.
Figures 9, 10:
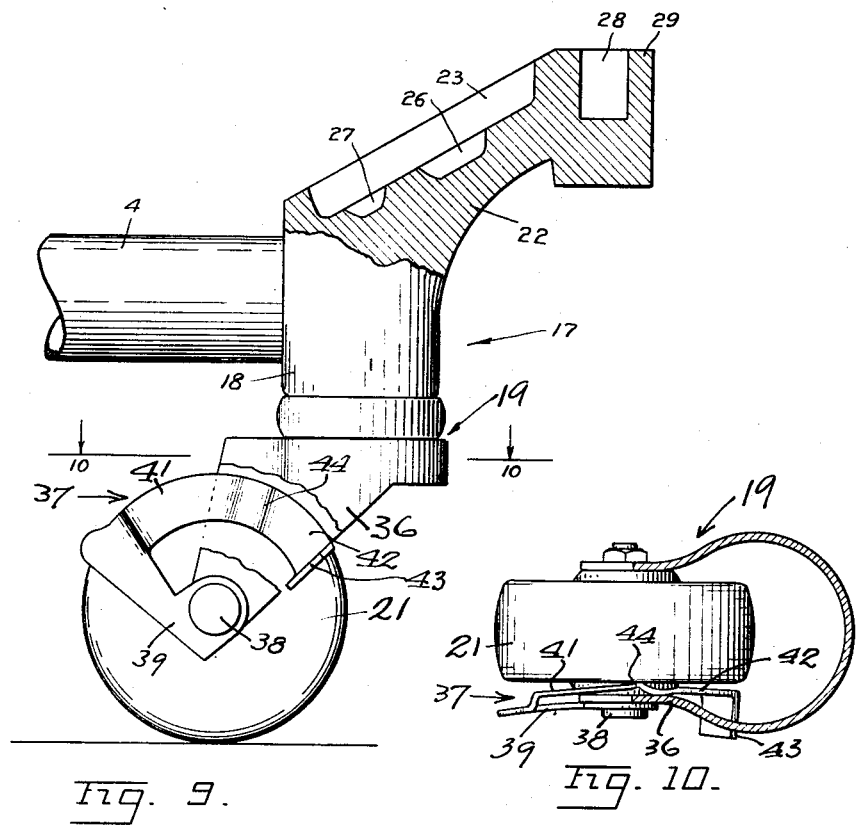
Fig. 9 is an enlarged detail sectional view of said engagement socket, and the brake on the caster wheel under said socket.
Fig. 10 is a sectional view of the caster wheel taken substantially to the lines 10—10 of Fig. 9 showing the brake applied on the caster wheel to prevent movement of the base.

In the illustrative embodiment of my invention, I make use of a hub 1, which in the present instance is provided with three radial hollow brackets 2, each of which is of substantially semicircular cross sections and has downwardly extended sides 3. These sides 3 of each radial bracket 2 fits over the end of an arm 4 which latter is pivoted by a transverse pivot pin 6 in the respective sides 3 of the bracket 2 so that it may be turned either to extended or collapsed positions. It is to be noted that the end 7 of each arm 4 is spaced from the center of the hub and it is so spaced from the pivot 6 that it fits into the socket formed by the brackets 2 in the collapsed position shown in Fig. 3.

Through the center of the hub 1 is provided a hole 8. A clamp 9 is formed with radial spokes 11 extended from a central clamp hub 12. In the center of the clamp hub 12 is a hole 13 into which is secured a threaded pin 14 which extends through the hole 8 in the hub 1. On the outer end of each spoke 11 is provided a transverse saddle 15 each of which fits against the curvature of the underside of each arm 4 in the extended position. The spokes 11 extend from the hub 12 in the clamp 9 at the same angles, or symmetrically to the angles of the radial brackets 2 of the hub 1. A suitable knurled nut 16 is on the threaded end of the pin 14. The clamp 9 is placed under the hub 1 and the pin 14 thereof is extended through the hole 8 of the hub upwardly and the knurled nut 16 is threaded on the end above the hub 1 so that when the nut 16 is tightened it draws up the clamp 9 against and towards the underside of the hub 1. In the collapsed position shown in Fig. 3 the clamp 9 is turned so that the spokes 11 and the saddles 15 are between the respective radial brackets 2 of the hub 1 and can be pulled up in that position allowing the pivotal collapsing of the arms 4. When the arms 4 are extended to the horizontal or operative positions shown in Figs. 1 and 2, then the clamp 9 is turned so that the saddles 15 are opposite the underside of the respective arms 4 and by tightening the nut 16 the arms 4 are tightly clamped in the extended position.

The arms 4 are preferably rods and for lightness sake may be of suitable material, such as tubing of sufficient strength to support the load for which the base is made. On the outer ends of each arm 4, is a socket bracket 17. Each socket bracket 17 includes a body 18 secured to the end of the arm 4. On the lower end of the body 18, which extends substantially at right angles to the axis of the arm 4, is pivoted in the usual manner a caster 19 which has the usual wheel 21 so that both the wheel rotates in the caster and the caster pivots on its usual pivot, and allow easy rolling of the base in any direction.

Figures 1, 2:
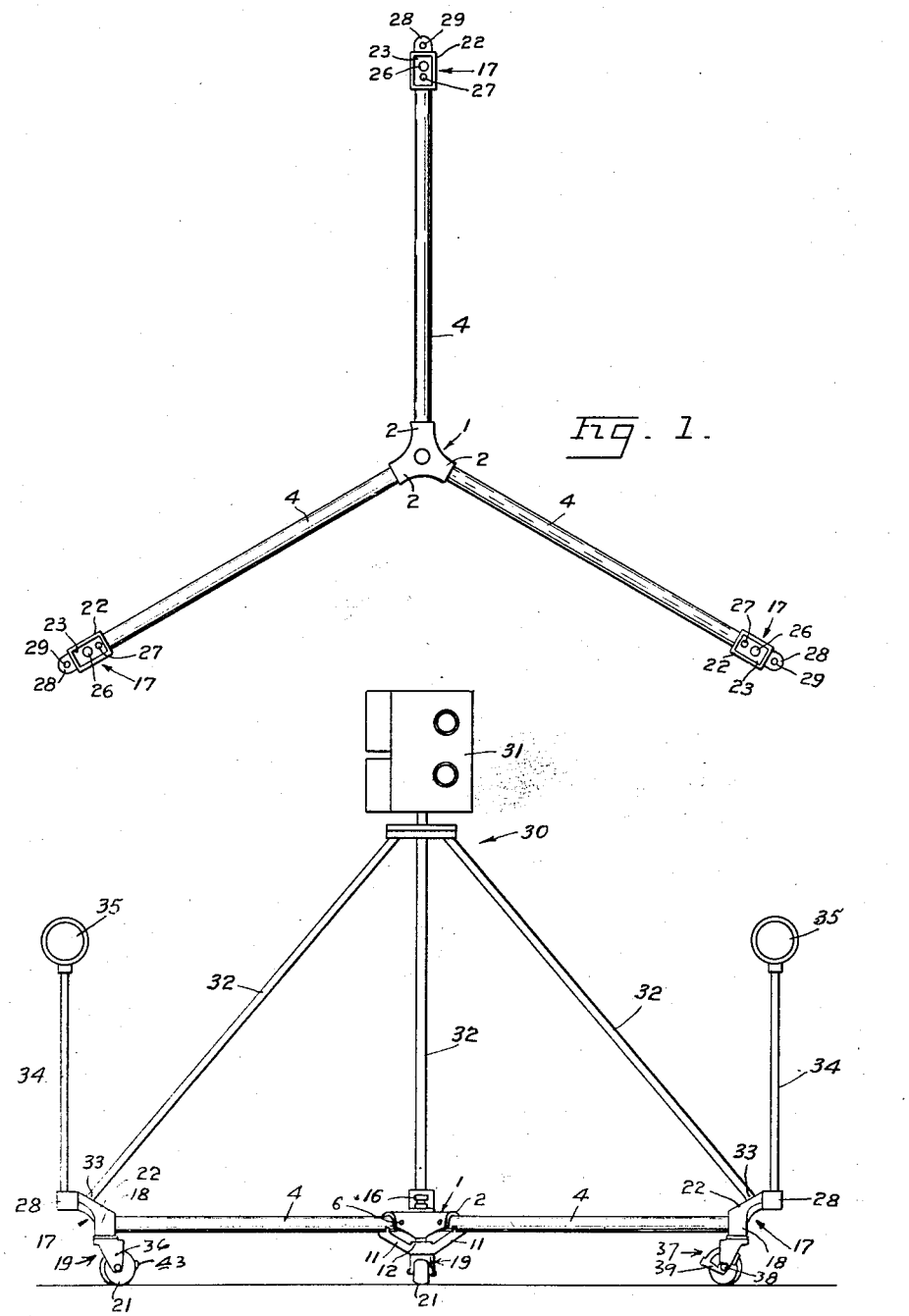
Fig. 1 is a plan view of the tripod base in extended position.
Fig. 2 is a side view of the base with a camera tripod thereon in operative position.

From the upper end of this bracket body 18 extends a socket base 22 at an included acute angle so that the upper face of the socket bracket 22 is inclined outwardly and upwardly from the end of the arm 4 when the arm 4 is in the extended position shown in Figs. 1 and 2. The top face of this socket bracket 22 is recessed and forms a substantially rectangular recess 23. In the bottom 24 of this rectangular recess 23 and in about the middle thereof is provided a tapered socket 26 which is adapted to fit the ends of various sizes of tripods of the usual type. Adjacent to this first socket 26 and nearer to the end of the arm 4 there is provided another end smaller socket 27 to accommodate tripods of different point construction.

On the outer end of the socket bracket 22 is provided an ear 28 with a substantially vertical hole or socket 29 therein to accommodate certain of the accessories to the instrument carried on the base as heretofore and hereinafter described. The last mentioned hole or socket 29 is at right angles to the axis of the arm 4 while the previous sockets 26 and 27 are at right angles to the face or angle of the socket bracket 22, so as to properly space the lights or instruments from the camera on the tripod in an out of way position.

As shown particularly in Figs. 1 and 2 a photographic tripod 30 which carries a photographic camera 31 or the like on its top in the usual manner has its tripod with three legs 32 extended so that the tips 33 of the tripod legs 32 are in the socket bracket 22 and engage respectively the recess therein or the sockets 26 or 27 according to the thickness and size of the tips 33 of said tripod legs 32. For instance smaller tripods with small tips may be placed in the smaller socket 27. Larger ones with suitable rubber tips thereon as provided may be inserted in the larger socket 26. Very large and heavy equipment with tripods which have larger bases can be just generally placed inside of the recess 23 and on the bottom thereof and engage the outside walls of said recess 23 to be held in place. In this extended position if, for instance, flood lights or flash lights or light measuring instruments are required, the rods 34 are inserted in the outer holes or sockets 29 so as to support at their top in a suitable position the flood lights 35 or any instruments which lights are suitably connected by extensible wires or cords to an electric circuit.

In order to prevent the movement or rolling of this base, after the base and the tripod are rolled into the desired position, a suitable brake is provided for each caster wheel 21 of the base. In the present form the brake is arranged between the side bracket 36 and the wheel 21. The brake is in the form of a plate 37 which is journalled on the axle 38 of the wheel 21 just outside of one of the side brackets 36. The forward portion of the plate extends upwardly from the pivoted portion 39 in front of the bracket 36 and substantially in line with the front edge of the same. The plate is then bent inwardly to the inside of the side bracket 36 and is bent at an angle so that it diverges rearwardly from the inside face of the bracket 36. This diverging portion 41 of the plate is normally spaced from the side of the wheel 21 but rearwardly converges toward the side of said wheel 21. From the rear end of this inclined or diverging brake portion 41 extends an arcuate arm portion 42 which is offset toward the bracket side 36 and away from the side of the wheel 21 and terminates at the rear end in an ear 43 which extends to the outside of the side bracket 36 and away from the wheel 21. Normally when the ledge 44 formed between the forward portion of the plate and the brake portion 42 of the plate is at the forward edge of the side bracket 36, the brake plate 41 is out of engagement and spaced from the side of the wheel 21. By pressing upon the ear upwardly the brake plate is swung forward and is engaged with the side of the wheel 21 to prevent its rotation. By applying the brake at two of three wheels 21 the base is locked against rolling from an adjusted position. This brake is easily applied or released by the foot working on the ear of the brake plate in the respective directions.

In operation the tripod and the base are carried in a collapsed position very easily. When the tripod is set up the base is also extended and the tips of the legs of the tripod are placed in the respective sockets on the base as the base is locked in the horizontal position. The inclined position of the socket surfaces restraining any tendency of spreading of the tripod legs. The accessories, such as the light rods and the lights are inserted in position and are directed at the desired angle with respect to the camera. Then as the photographer changes the position of the camera or moves it to various parts of a room or wherever he wishes to take a photograph, it moves simultaneously the tripod and the camera and its lights in said predetermined position very easily and without any exertion or great force and without the necessity of collapsing or changing the tripod or the angle of his camera or the position of the lights relatively to the tripod. The entire unit can be easily turned around in various directions and carried to distances without disturbing the set-up, and thereby allows a much better control for photography or for the use of lights or instruments as well as great facility and accuracy and quickness in adjustment.

I claim:

1. In a base for a tripod of the character described, a plurality of radially extended arms, a tripod tip supporting socket on the outer end of each arm, a hub pivotally supporting the inner ends of the respective arms and holding said arms in extended position, a releasable clamp on said hub for clamping the pivoted ends of said arms into said hub, said hub having radially extended bearings closed at the top and open at the bottom, the central ends of the arms being pivoted in the respective hub bearings for folding the arms together and extending them respectively, said clamp engaging the under side of said arms opposite the open sides of said bearings to hold said arms in the respective bearings.

2. In a base for a tripod of the character described, a plurality of radially extended arms, a tripod tip supporting socket on the outer end of each arm, a hub pivotally supporting the inner ends of the respective arms and holding said arms in extended position, a releasable clamp on said hub for clamping the pivoted ends of said arms into said hub, said hub having radially extended bearings closed at the top and open at the bottom, the central ends of the arms being pivoted in the respective hub bearings for folding the arms together and extending them respectively, said clamp engaging the under side of said arms opposite the open sides of said bearings to hold said arms in the respective bearings, and means to pivotally support said clamp to allow the turning of said clamp into and out of alignment with said arms and said hub bearings.

3. In a base for a tripod, a central hub having radial bearings closed at the top and open at the bottom, an arm pivoted in each bearing to be foldable into collapsed position on said hub and into extended position, a socket on the outer end of each arm at an angle to the respective arms to hold the tip of a tripod leg when said arms are extended, a clamping element under said hub being engageable with the inner ends of said arms to clamp said arms into said hub in the extended position, and co-acting means on said hub and on said clamp for tightening said clamp against said arms and said hub.

4. In a base for a tripod, a central hub having radial bearings closed at the top and open at the bottom, an arm pivoted in each bearing to be foldable into collapsed position on said hub and into extended position, a socket on the outer end of each arm at an angle to the respective arms to hold the tip of a tripod leg when said arms are extended, a clamping element under said hub being engageable with the inner ends of said arms to clamp said arms into said hub in the extended position, co-acting means on said hub and on said clamp for tightening said clamp against said arms and said hub, said clamping element including a hub on said tightening means, spokes extended from said hub and adapted to engage the respective arms in the extended position of the latter, said hub being turnable to shift said spokes between said arms to allow the collapsing of said arms in said hub bearing.

5. In a base for a tripod of the character described, a plurality of radially extended arms, a hub to foldably connect the adjacent ends of said arms, a clamp to clamp the arms in extended position into said hub, an inclined socket on the outer end of each arm inclined upwardly and outwardly with respect to the axis of the extended arm, and another socket on the first socket extended at a different angle than said first socket to support auxiliary equipment in predetermined relation to said tripod on said base.

6. In a base for a tripod of the character described, a plurality of radially extended arms, a hub to foldably connect the adjacent ends of said arms, a clamp to clamp the arms in extended position into said hub, a socket body on the outer end of each arm, the upper face of said socket body being substantially plane having a recess therein and being inclined at an upward and outward angle to the axis of the arm in the extended position of the arm, and having walls adapted to be abutted by the tip of a tripod leg, a socket on said inclined face of each socket element to receive a tripod leg tip, and an extension socket extended from said socket body at an angle different from the angle of incline of said surface for supporting auxiliary equipment in a predetermined relation to a tripod on said base.

JULIUS BLOCH.

REFERENCES CITED

The following references are of record in the file of this patent:

UNITED STATES PATENTS

| Number | Name | Date |
| --- | --- | --- |
| 213,844 | Sloan | Apr. 1, 1879 |
| 525,298 | Thiele et al. | Aug. 28, 1894 |
| 649,300 | Hall et al. | May 8, 1900 |
| 1,189,053 | Buchanan | June 27, 1916 |
| 1,304,677 | Gomez | May 27, 1919 |
| 1,618,493 | Thiele | Feb. 22, 1927 |
| 1,671,774 | McIntosh | May 29, 1928 |
| 2,068,160 | Zeindler | Jan. 19, 1937 |
| 2,277,787 | Scott | Mar. 31, 1942 |
| 2,357,165 | Brady | Aug. 29, 1944 |